United States Patent
Zhang et al.

(10) Patent No.: US 10,465,564 B2
(45) Date of Patent: Nov. 5, 2019

(54) SYSTEM AND METHOD FOR HIGHER PLANT EFFICIENCY

(71) Applicant: General Electric Company, Schenectady, NY (US)

(72) Inventors: Hua Zhang, Greenville, SC (US); Iris Hu, Greenville, SC (US)

(73) Assignee: General Electric Company, Schenectady, NY (US)

(*) Notice: Subject to any disclaimer, the term of this patent is extended or adjusted under 35 U.S.C. 154(b) by 403 days.

(21) Appl. No.: 15/286,305

(22) Filed: Oct. 5, 2016

(65) Prior Publication Data
US 2018/0094549 A1    Apr. 5, 2018

(51) Int. Cl.
| | |
|---|---|
| *F01K 9/02* | (2006.01) |
| *F01K 23/10* | (2006.01) |
| *F02C 6/18* | (2006.01) |
| *F01N 5/02* | (2006.01) |
| *F01K 3/18* | (2006.01) |
| *F01K 7/16* | (2006.01) |
| *F01K 9/00* | (2006.01) |
| *F01K 13/02* | (2006.01) |

(52) U.S. Cl.
CPC ............ *F01K 23/101* (2013.01); *F01K 3/185* (2013.01); *F01K 7/16* (2013.01); *F01K 9/003* (2013.01); *F01K 9/023* (2013.01); *F01K 13/02* (2013.01); *F01N 5/02* (2013.01); *F02C 6/18* (2013.01); *F05D 2220/31* (2013.01); *F05D 2220/32* (2013.01); *F05D 2220/62* (2013.01); *F05D 2220/72* (2013.01); *F05D 2270/3061* (2013.01); *Y02E 20/16* (2013.01)

(58) Field of Classification Search
CPC .......... F01K 23/101; F01K 3/185; F01K 7/16; F01K 9/00; F01K 9/003; F01K 9/023; F02C 6/18
See application file for complete search history.

(56) References Cited

U.S. PATENT DOCUMENTS

| | | | |
|---|---|---|---|
| 8,943,836 B2 | 2/2015 | Rose et al. | |
| 10,100,679 B2 * | 10/2018 | Geveci | .................... F01K 23/10 |

(Continued)

OTHER PUBLICATIONS

Extended European Search Report and Opinion issued in connection with corresponding EP Application No. 17194390.5 dated Apr. 5, 2018.

*Primary Examiner* — Gerald L Sung
*Assistant Examiner* — Christopher M Adams
(74) *Attorney, Agent, or Firm* — Fletcher Yoder, P.C.

(57) ABSTRACT

A steam cycle system includes a heat recovery steam generator (HRSG) which receives exhaust gases, a steam turbine coupled to the HRSG which receives a first steam flow generated by the HRSG, and a condenser which condenses a second steam flow output by the steam turbine. The condenser includes a plurality of heat exchanger tubes, a fan, and a steam collection header. The system includes one or more sensors which measure one or more properties of the steam flow. The system includes a closed-loop controller communicatively coupled to the one or more sensors. The controller receives data from the one or more sensors, determines a flow rate of the second steam flow through the steam header using the one or more sensors, calculates whether the flow rate of the steam is within a threshold, and adjusts one or more operating parameters of the fan.

20 Claims, 5 Drawing Sheets

(56) References Cited

U.S. PATENT DOCUMENTS

| | | |
|---|---|---|
| 2005/0072170 A1 | 4/2005 | Taniguchi et al. |
| 2011/0066298 A1 | 3/2011 | Francino et al. |
| 2011/0146307 A1* | 6/2011 | Ofer .................... F01K 23/101 62/89 |
| 2012/0096864 A1 | 4/2012 | Chillar et al. |
| 2012/0240551 A1* | 9/2012 | Johnson .................. F02C 6/18 60/266 |
| 2014/0250890 A1 | 9/2014 | Takahashi et al. |
| 2014/0311141 A1 | 10/2014 | Mori et al. |
| 2014/0318130 A1 | 10/2014 | Duong |

\* cited by examiner

SYSTEM AND METHOD FOR HIGHER PLANT EFFICIENCY

BACKGROUND OF THE INVENTION

The subject matter disclosed herein relates to combined cycle power plants, particularly systems and methods for improving efficiency of the power plant based on operating equipment of the power plant at part load based on operating conditions of the power plant.

BRIEF DESCRIPTION OF THE INVENTION

Certain embodiments commensurate in scope with the originally claimed invention are summarized below. These embodiments are not intended to limit the scope of the claimed invention, but rather these embodiments are intended only to provide a brief summary of possible forms of the invention. Indeed, the invention may encompass a variety of forms that may be similar to or different from the embodiments set forth below.

In a first embodiment, a steam cycle system includes a heat recovery steam generator (HRSG) which receives exhaust gases, a steam turbine fluidly coupled to the HRSG which receives a first steam flow generated by the HRSG, and a condenser that condenses a second steam flow output by the steam turbine. The condenser includes a plurality of heat exchanger tubes, a fan, and a steam collection header. The system includes one or more sensors which measure one or more properties of the steam flow. The system includes a closed-loop controller communicatively coupled to the one or more sensors. The controller receives data from the one or more sensors, determine a flow rate of the second steam flow through the steam header using the one or more sensors, calculates whether the flow rate of the steam is within a threshold, and adjusts one or more operating parameters of the fan based at least in part on the flow rate of the steam.

In a second embodiment, a system includes a gas turbine engine and a steam cycle. The steam cycle includes a heat recovery steam generator (HRSG) which receives exhaust gases, a steam turbine fluidly coupled to the HRSG which receives a first steam flow generated by the HRSG, and a condenser that condenses a second steam flow output by the steam turbine. The condenser includes a plurality of heat exchanger tubes, a fan, and a steam collection header. The steam cycle includes one or more sensors configured to measure one or more properties of the steam flow. The steam cycle includes a closed-loop controller communicatively coupled to the one or more sensors, where the controller receives data from the one or more sensors, determines a flow rate of the second steam flow through the steam header using the one or more sensors, calculates whether the flow rate of the steam is within a threshold, and adjusts one or more operating parameters of the fan based at least in part on the flow rate of the steam.

In a third embodiment, a tangible, non-transitory computer-readable media storing computer instructions thereon, the computer instructions, when executed by a processor, receive, via a controller, data from one or more sensors. The computer instructions determine a flow rate of the steam through a steam header coupled to a condenser disposed in a combined cycle power plant using the one or more sensors. The computer instructions calculate whether the flow rate of the steam is within a threshold. The computer instructions adjust one or more operating parameters of the fan based at least in part on the flow rate of the steam.

BRIEF DESCRIPTION OF THE DRAWINGS

These and other features, aspects, and advantages of the present invention will become better understood when the following detailed description is read with reference to the accompanying drawings in which like characters represent like parts throughout the drawings, wherein.

DETAILED DESCRIPTION OF THE INVENTION

One or more specific embodiments of the present invention will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present invention, the articles "a," "an," "the," and "said" are intended to mean that there are one or more of the elements. The terms "comprising," "including," and "having" are intended to be inclusive and mean that there may be additional elements other than the listed elements.

The embodiments disclosed herein relate to a system and method for improving efficiency of a power plant, based in part on adjusting the operation of equipment (e.g., a condenser) in the power plant based in part on the load. As discussed below, the power plant may include a compressor, a combustor, a gas turbine engine, and a steam cycle. The steam cycle of the power plant includes a heat recovery steam generator (HRSG), a steam turbine, and/or a condenser. The condenser may include a fan and one or more sensors. The sensors may be flow rate sensors, acoustical wave sensors, temperature sensors, pressure sensors, humidity sensors, composition sensors, or any combination thereof. The controller may also receive data output by other sensors that are configured to measure operating conditions of other components of the power plant system, such as the compressor, the gas turbine, or other components.

The controller uses the data output by the sensor to adjust the power usage of the condenser, as the load of the power plant changes. The actual operation of the condensers within the plant or steam cycle can be modified or controlled in a number of ways, including by controlling the speed of the fan within the each condenser, adjusting the pitch of the fan blades, using the condenser model to monitor the health of the tube bundles and the fan, and/or by using fewer than all of the condensers.

Figure 1:
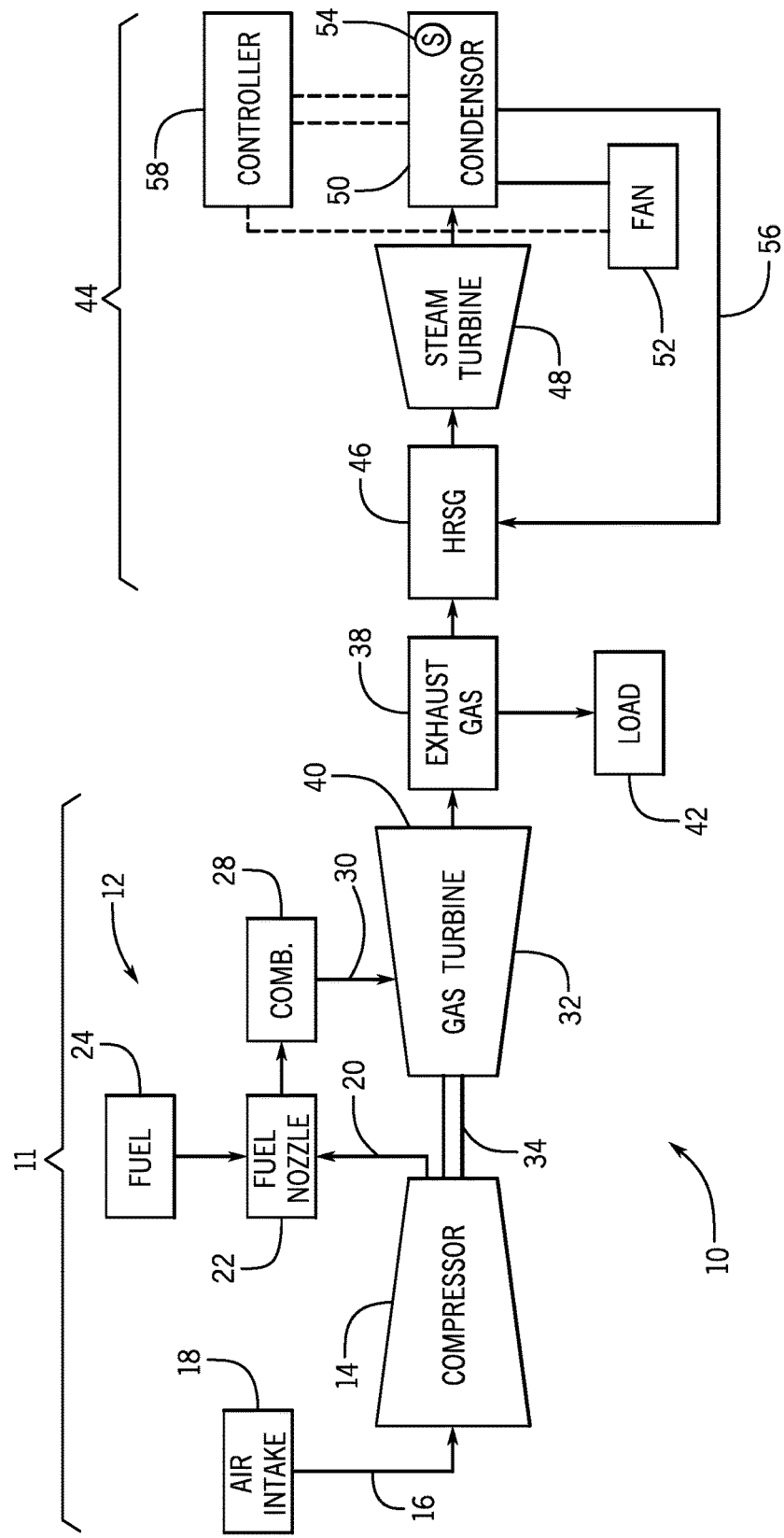
FIG. 1 is a block diagram of an embodiment of a combined cycle power generation system having a gas turbine, a steam turbine, a heat recovery steam generation (HRSG) system, and a steam cycle.

Turning now to the drawings, FIG. 1 is a block diagram of an embodiment of a power plant 10 having a gas turbine 32. A compressor 14 intakes ambient air 16 to the gas turbine system 12 via an air intake 18. The ambient air 16 is taken in by the air intake 18 into the gas turbine system 12 via a suitable mechanism, such as a cold air intake, for subsequent entry of an inlet air into the compressor 14. The compressor 14 compresses the inlet air, forming pressurized air 20 by rotating blades within the compressor 14. When the compressor 14 compresses the inlet air, the compressor 14 adds energy to the inlet air thereby increasing the pressure and the temperature such that the pressurized air 20 is warmer and at a higher pressure than the ambient air. The pressurized air 20 may be discharged into one or more fuel nozzles 22, which mix the pressurized air 20 and a fuel 24 (e.g., a liquid fuel and/or gas fuel, such as natural gas) to produce an air-fuel mixture 26 suitable for combustion. Although the illustrated embodiment depicts air 14, the intake gas may include ambient air, oxygen, oxygen-enriched air, oxygen-reduced air, exhaust recirculation gas (EGR), or any combination thereof. Nevertheless, the following discussion refers to ambient air as a non-limiting example. The fuel 24 supplied to the system 10 may include gases (e.g., natural gas, LNG, LPG, refinery gas, coal gas, hydrogen gas), liquids (e.g., diesel, kerosene, naphtha, ethanol, methanol, crude oils), or any other suitable fuel source.

As depicted, the pressurized air 20 enters the fuel nozzle 22 and mixes with fuel 24. The fuel nozzle 22 directs the air-fuel mixture 26 into a combustor 28. The combustor 28 ignites and combusts the air-fuel mixture 26, to form combustion products 30. The combustion products 30 are directed to a gas turbine 32, where the combustion products 30 expand and drive blades of the gas turbine 32 about a shaft 34. The gas turbine 32 is connected to the compressor 14 by the common shaft 34. Compressor vanes or blades are included as components of a compressor 14. Blades within the compressor 14 are coupled to the shaft 34, which is driven by the gas turbine 32. The shaft 34 is coupled to several components (e.g., compressor 14, gas turbine 32 throughout the gas turbine system 10). Eventually, the combustion products 30 exit the gas turbine 32 as exhaust gases 38, which then exit the gas turbine system 10 via an exhaust outlet 40. In some embodiments, a portion of the exhaust gases 38 may be utilized to drive a load 42. The load 42 may include an electrical generator, a pump, other shaft driven equipment, and so forth. In other embodiments, all or the remaining portion of the exhaust gases 38 may be transported to a steam cycle 44. The steam cycle 44 may include a heat recovery steam generator (HRSG) 46, a steam turbine 48, and/or a condenser 50. As shown, the condenser 50 may include a fan 52 and one or more sensors 54. The specific configuration of the steam cycle 44, as well as the gas turbine system 12, may be implementation-specific and may include any combination of components.

The components of the HRSG 46 in the illustrated embodiment are a simplified depiction of the HRSG 46 and are not intended to be limiting. Rather, the illustrated HRSG 46 is shown to convey the general operation of such HRSG systems. Heated exhaust gas 38 from the gas turbine 32 may be transported into the HRSG 46 and used to heat steam used to power the steam turbine 48. Exhaust from the steam turbine 48 may be directed into the condenser 50. Condensate 56 from the condenser 50 may, in turn, be directed into a low-pressure section of the HRSG 46 with the aid of a condensate pump (see FIG. 2).

As discussed herein, components of the steam cycle 44 may be controlled based on measurements of sensors 54 used by a controller 58 of the condenser 50. The sensors 54 may be flow rate sensors, acoustical wave sensors, temperature sensors, pressure sensors, humidity sensors, composition sensors, or any combination thereof. The controller 58 may also receive data output by other sensors that are configured to measure operating conditions of other components of the power plant system 10, such as the compressor 14, the gas turbine 32, or other components. The controller 58 uses the data output by the sensor 54 to adjust the power usage of the condenser 50, as the load of the power plant system 10 changes. The fan power usage may be changed by varying the rotor speed or the blade pitch angle.

Figure 2:
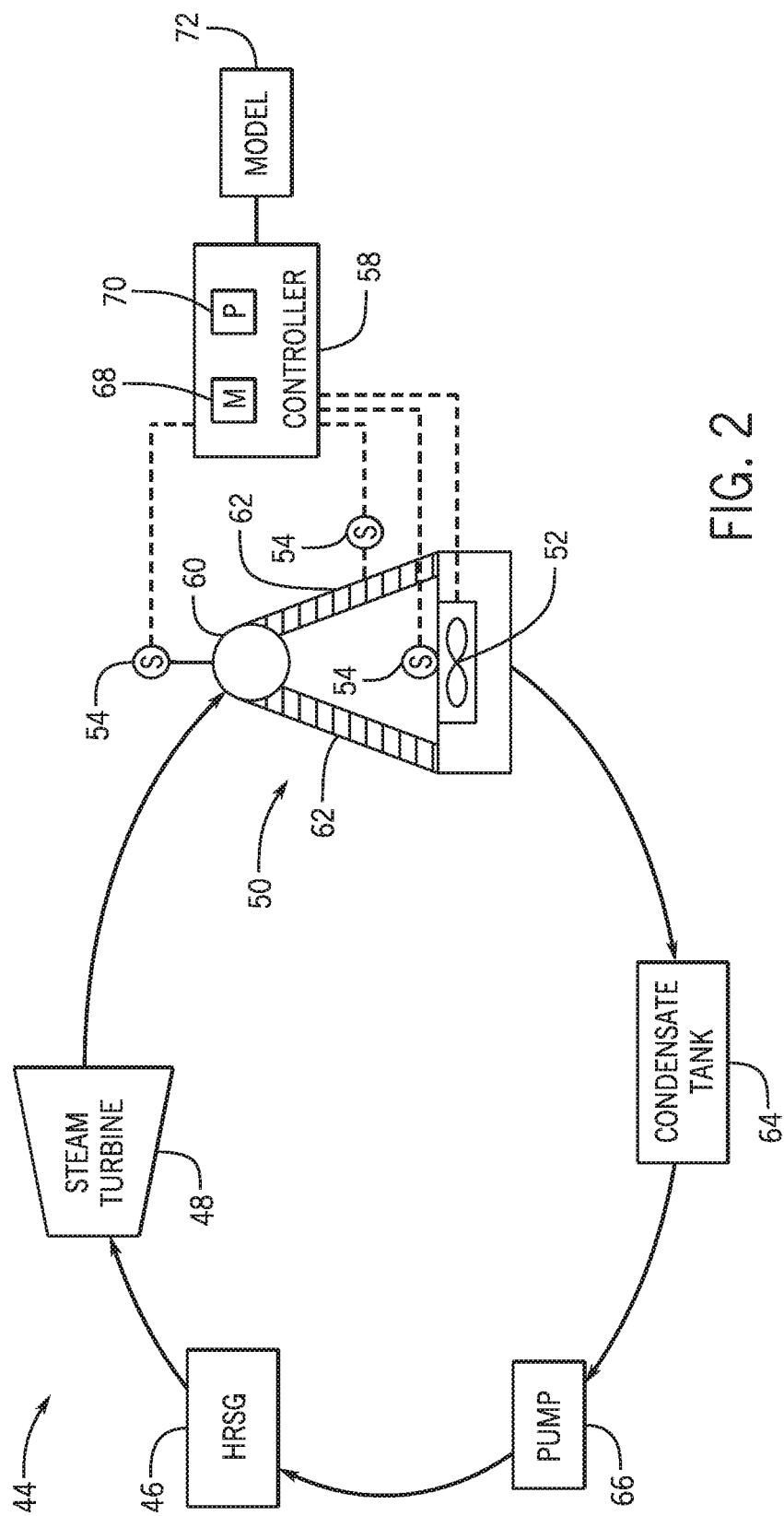
FIG. 2 is a block diagram of an embodiment of the steam cycle used in the power plant of FIG. 1.

FIG. 2 is a block diagram of an embodiment of the steam cycle 44 used in the power plant system 10 of FIG. 1. As described above, the exhaust from the steam turbine 48 flows to a condenser 50. Though one condenser 50 is shown, it should be appreciated the power plant system 10 may include anywhere from 1 to 1,000 or more condensers 50. The exhaust gases (e.g., steam) that exit the steam turbine 48 are cooled by the fans 52 that are a component of the condenser 50. The exhaust gases (e.g., steam) enter the condenser 50 via a steam header 60. As the exhaust gases (e.g., steam) flow through the header 60, the fans 52 move cooling air across a plurality of heat exchanger tube bundles 62.

The steam within the tube bundles 62 returns to liquid form (e.g., water) and flows to the bottom of the condenser 50. The liquid is then collected in a condensate tank 64. A condensate pump 66 moves the liquid back to the HRSG 46 for reheating the liquid, thereby completing an iteration of the steam cycle 44. As shown, the controller 58 is coupled to the condenser 50. Though the controller 58 is shown as communicatively coupled to the condenser 50, the controller 58 may control other components of the power plant system 10, including, but not limited to, the compressor 14, the combustor 28, the gas turbine 32, the HRSG 46, the steam turbine 32, or any combination thereof. Additionally or alternatively, the controller 58 may work with other controllers in the power plant system 10. For example, the gas turbine cycle 11 and the steam cycle 44 may have separate controllers that work cooperatively to manage the power plant system 10.

The controller 58 includes a memory 66 and a processor 70. The memory 66 stores program instructions that are loadable and executable on the processor(s) 70, as well as data generated during the execution of these programs. Depending on the configuration and type of the controller 58, the memory 66 may be volatile (such as random access memory (RAM)) and/or non-volatile (such as read-only memory (ROM), flash memory, etc.). The memory 66 may also include additional removable storage and/or non-removable storage including, but not limited to, magnetic storage, optical disks, and/or tape storage. The disk drives and their associated computer-readable media may provide non-volatile storage of computer-readable instructions, data structures, program modules, and other data for the computing devices. In some implementations, the memory 66 may include multiple different types of memory, such as static random access memory (SRAM), dynamic random access memory (DRAM), or ROM. The memory 66 includes tangible, non-transitory computer-readable storage media. Combinations of any of above should also be included within the scope of computer-readable media.

The one or more sensors 54 disposed throughout the steam cycle 44 and the power plant 10 may output data. The controller 58 may receive data output by the various sensors 54, including but not limited to the flow rate sensors, the acoustical wave sensors, the temperature sensors, the pressure sensors, the humidity sensors, the composition sensors, or any combination thereof. The controller 58 may also receive data output by other sensors 54 that are configured to measure operating conditions of other components of the power plant system 10, such as the compressor 14, the gas turbine 32, HRSG 46, steam turbine 48, or other components.

The controller 58 uses the data output by the sensor 54 to adjust the power usage of the condenser 50, as the load of the power plant 10 changes. For example, when the power plant 10 does not run at its full capacity, less power is used to run the equipment in the power plant 10. The condenser 50 and its components, such as the fan 52, may waste energy unless run at less than full capacity to cool the steam output by the steam turbine 48 when the power plant 10 does not run at full capacity because less steam is output by the steam turbine 48 at part load due to less heat generated by the gas turbine cycle. When the power plant 10 is run at part load, the steam is reduced to condensate more quickly as the ambient air surrounding the tube bundles 62 is able to provide more than enough cooling.

In other words, the power requirements of the fan 52 are less when the power plant 10 is run at part load than when the power plant 10 is run at full capacity. The controller 58 adjusts the power used by the fan 52 and other equipment in the power plant 10 so that the energy used by the plant 10 can be reduced when the power plant 10 is run at part load.

In one non-limiting example, the controller 58 uses the sensor input to control the speed at which the fan 52 operates (e.g., how much power the fan motor uses). For example, the controller 58 may adjust the speed at which the fan 52 rotates based at least in part of the steam flow rate through the header 60. As described above, when less cooling of the steam is used to produce condensate, the fans 52 can rotate at a slower speed so that excessive energy is not used to cool the steam. In another non-limiting example, the controller 58 uses the sensor input to adjust the fan speed based at least in part on a steam flow velocity, steam temperature, and steam pressure of a particular section of the tube bundles 62. In any of the described examples, the speed of the fan may be adjusted by using a variable frequency drive. In another non-limiting example, the controller 58 uses the sensor input to reduce the power usage of condenser 50 to reduce the number of condensers that are in operation at a part load condition, based at least in part on the sensor data input received by the controller 58.

In another non-limiting example, the controller 58 uses the sensor input to adjust the fan blade pitch of the fan 52 to reduce power consumption. For example, the controller 58 may adjust the pitch of the fan blade based at least in part on the flow rate, temperature, and pressure of the steam. For example, the blade pitch may be increased to reduce the loading of the fan blades to reduce the cooling flow to the fin-tube heat exchanger. Changing the blade pitch effectively reduces the power usage of the fan 52 by reducing the cooling requirements at part load of the power plant.

The controller 58 may be configured to use a condenser model 72. The condenser model 72 may be used to adjust operations of the of fan 52 based in part on the data output by the sensors 54 and empirical data. For example, the empirical data that may be used by the condenser model 72 may include environmental conditions such as an ambient air temperature, a relative percent humidity of the ambient air, and condensate conditions such as pressure of steam flow, temperature, of steam flow, rate of steam flow, and so forth. The condenser model 72 may be used to monitor the health of the tube bundles 62 and the fan 52. In one non limiting example, the condenser model 72 may be used to reduce a flow of ambient air to the fan blades as build up (e.g., debris) accumulates on the blades of the fan 52. Moreover, the condenser model 72 may be used to determine a degradation scenario based at least in part of the empirical data, where the degradation scenario indicates estimated degradation based on operation conditions and/or parameters. The degradation scenario may be used to adjust future operations of the steam cycle, the gas turbine cycle, the condenser 50, generate a maintenance schedule for the condenser 50, generate capital estimates associated with regenerating the condenser 50, and so forth. For example, the controller 58 may use the degradation scenario and data pertaining to environmental conditions, fluid flow (e.g., steam flow), or other conditions to adjust the operation of the components of the condenser 50, the compressor 14, the combustor 28, the gas turbine 32, the HRSG 46, the steam turbine 48, or any combination thereof. In some embodiments, the controller 58 may use the degradation scenario to adjust operation of certain components (e.g., fan blades) to reduce degradation of the components based in part on data received (e.g., steam flow rate) by the sensors 54.

The condenser model 72 may be used to adjust operation of the fan 52 based on fouling that occurs as the condensate moves through the tube bundles 62 and other components of the condenser 50. The condenser model 72 may be used to adjust operation of the fan 52 based on a threshold factor. The threshold factor may account for an online time of the gas turbine 32, a desired emission level of the gas turbine 32, a suitable build up level on the fan blades of the condenser 50, a fouling factor calculation associated with the tube bundles 62, or other operating parameters.

In one embodiment, PREDIX™ available from General Electric Company, Schenectady, N.Y. can be used as a platform for use in implementation of a real-time, wide-area control environment to safely and securely deploy, manage, upgrade, and decommission a set of condensers, fans, or other equipment in a controlled, deterministic manner.

Figure 3:
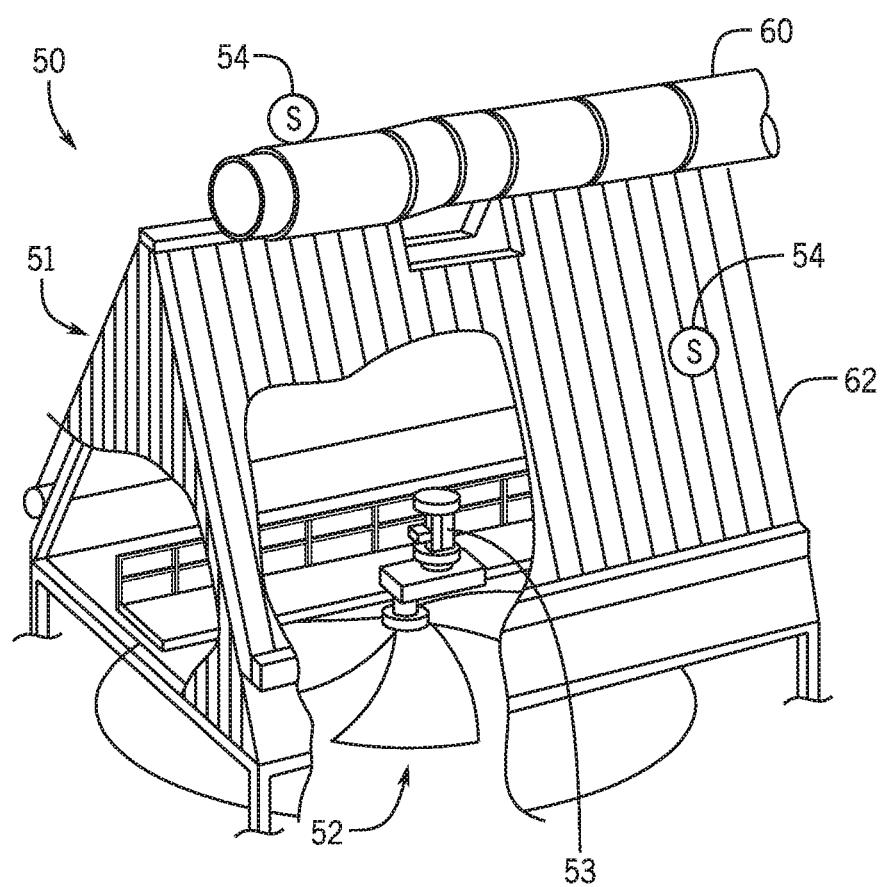
FIG. 3 is a schematic diagram of an embodiment of a condenser used in the steam cycle.

FIG. 3 is a schematic diagram of an embodiment of the condenser 50 used in the steam cycle 44. Steam is delivered to the condenser 50 via a delivery pipe or header 60 disposed at the top of the condenser 50. The steam is then passed down through a heat exchanger portion 51 of the condenser 50 in a series of heat exchange tubes 62. The tube bundles 62, which form the heat exchanger 51 may be arranged in a generally A-shaped configuration, as illustrated, or in any other suitable configuration. An expanded, cut-away view of a portion of the heat exchanger portion 51 is illustrated to depict one possible heat exchanger configuration having tubes 62 and the fins on the tubes 62. However, the use of other tube and fin configurations within the heat exchanger 51 is possible. In any event, the fins are exposed to the ambient air and form a heat sink having a large amount of surface area. The fins dissipate the heat within the steam traveling through the tube bundles 62. As the steam flows down inside the tubes 62, the steam condenses due to the cooling effect of ambient air drawn over the external surfaces of the tubes 62. The fan 52, located at the bottom part of the A-shaped framework, operates to draw ambient air through the heat exchanger 51 formed by the finned tubes 62. Condensate drains into a condensate tank (as shown in FIG. 2), before being pumped back to the HRSG 46 shown in FIG. 1.

A motor 53 drives or rotates the blades of the fan 52 that draws ambient air across and over the fins disposed on the tubes 62. As ambient air passes across the fins of the tubes 62, the air absorbs the heat from, thereby removing heat from the steam flowing through the tubes 62. This heat transfer operation causes the steam to return to liquid form (e.g., water) which is collected at the bottom of the condenser 50.

Generally speaking, the controller 58 may operate the fan driven condensers 50 to operate all of the condensers or a subset of the total number of condensers 50 at any particular time, based on the current load demand and environmental conditions. The actual operation of the condensers 50 within the plant or steam cycle can be modified or controlled in a number of ways, including by controlling the speed of the fan 52 within each condenser 50, adjusting the pitch of the fan blades, using the condenser model 72 to monitor the health of the tube bundles 62 and the fan 52, and/or by using fewer than all of the condensers 50.

Figure 4:
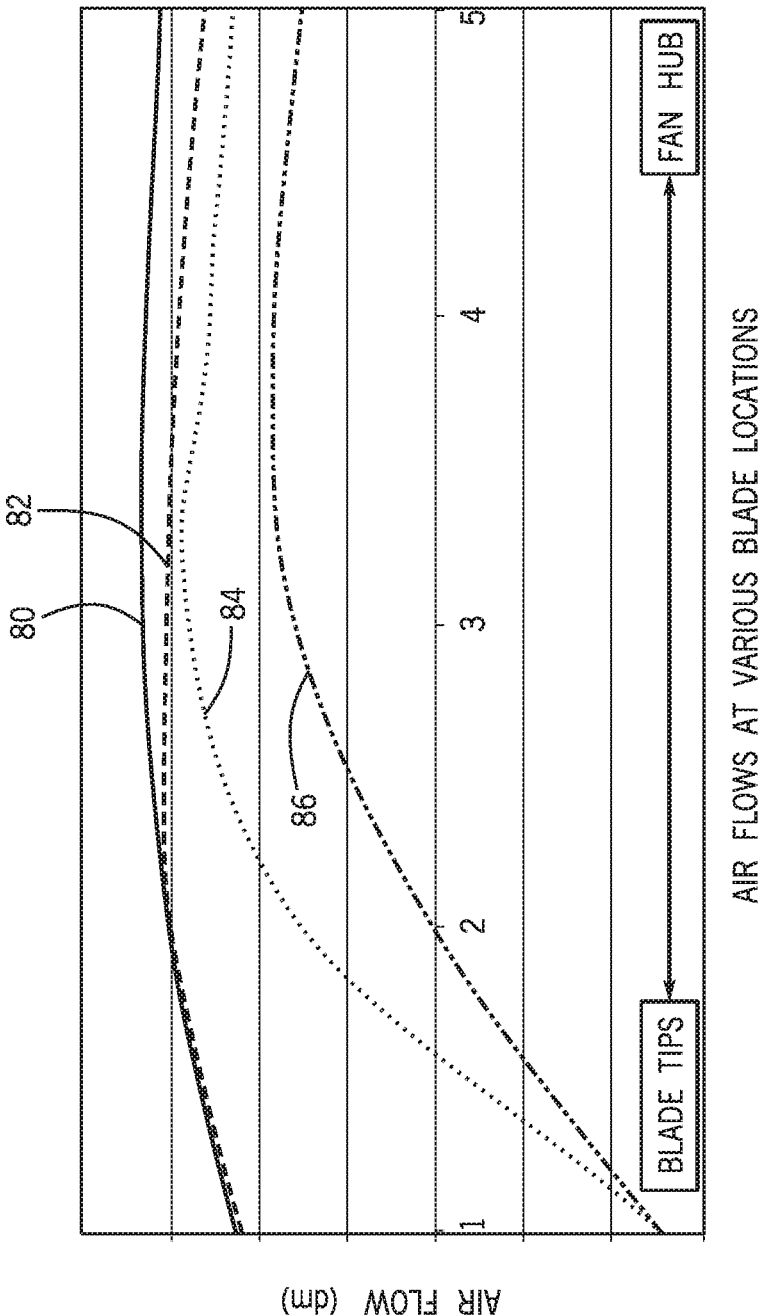
FIG. 4 is a plot illustrating an air flow profile of two fan blades of the condenser at different operating stages.

FIG. 4 is a plot illustrating an air flow profile of various fan blades of the condenser 50. As described above, the condenser model 72 may be used to monitor the health of the tube bundles 62 and the fan 52. In one non-limiting example, the condenser model 72 may reflect reduced flow of ambient air to the fan blades due to build up (e.g., debris) as it accumulates on the blades of the fan 52. In the plot shown below, the lines 80, 82 illustrate air flow profiles associated with fan blades having a relatively clean state. The lines 84, 86 illustrate an air flow profile associated with the fan blades having a relatively dirty state due to operation. As shown, the air flow is reduced after build up has accumulated on the fan blades of the condenser 50. The air flow profiles of various fan blades can be generated by the condenser model 72 and used to adjust the air flow around the condenser as the build up accumulates to accommodate the fan 52 running at part load (e.g., lower capacity) due to the build up. For example, if the fan 52 is relatively dirty, an amount of speed reduction may be less than for a relatively clean fan 52 since flow across the fan 52 is already reduced due to buildup.

Figure 5:
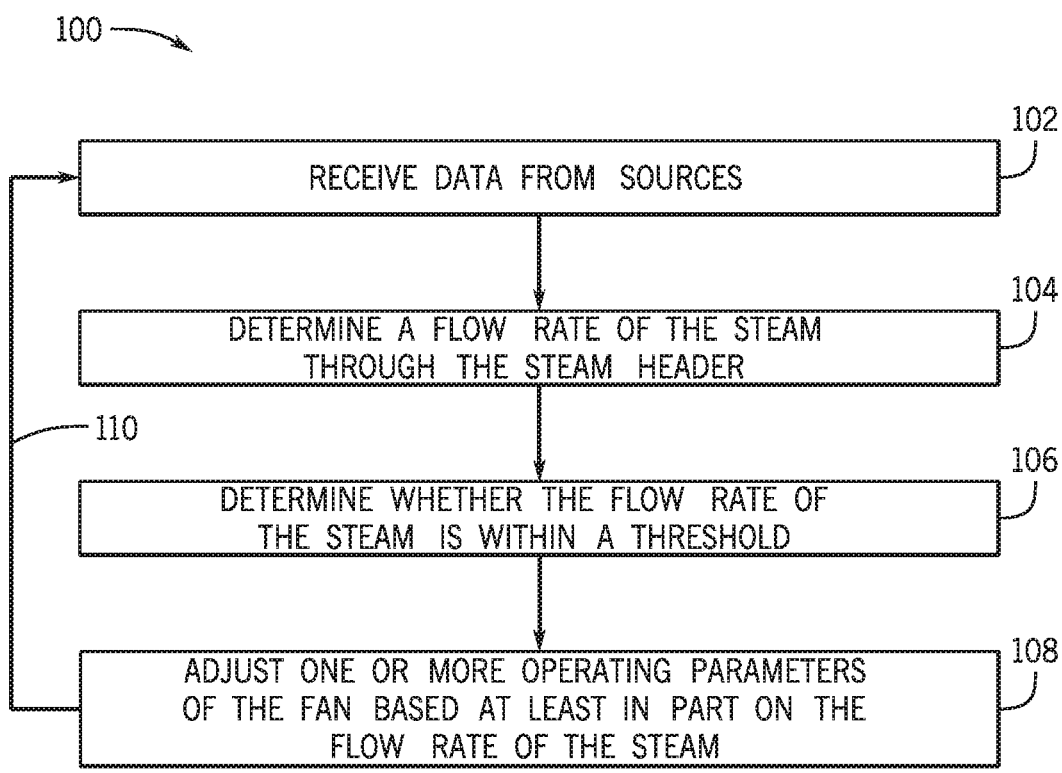
FIG. 5 is a flow diagram illustrating details of an example method for adjusting one or more operating parameters of condenser, according to an embodiment.

FIG. 5 is a flow diagram illustrating details of an example method for adjusting one or more operating parameters of the condenser 50, according to an embodiment. The method 100 may include receiving (block 102) data from the sensors configured to measure operating parameters of the condenser 50 or other components of the power plant 10. The method 100 may include determining (block 104) the flow rate of steam through the steam header 60. The method 100 may include calculating (block 106) whether the flow rate of the steam is within a threshold. The method 100 may include adjusting (block 108) one or more operating parameters of the fan 52 based at least in part on the flow rate of the steam when the flow rate of the steam is not within in a threshold. The method 100 may include continuing (line 110) to monitor the operating parameters of the power plant (e.g., online time since last cleaning, air quality, etc.), including the steam flow rate when the flow rate of the steam is within a threshold.

Various instructions, methods, and techniques described herein may be considered in the general context of computer-executable instructions, such as program modules, executed by one or more computers or other devices. Generally, program modules include routines, programs, objects, components, data structures, etc., for performing particular tasks or implementing particular abstract data types. These program modules and the like may be executed as native code or may be downloaded and executed, such as in a virtual machine or other just-in-time compilation execution environment. The functionality of the program modules may be combined or distributed as desired in various embodiments. An implementation of these modules and techniques may be stored on some form of computer-readable storage media.

The example system shown in FIGS. 1-3 are provided by way of example only. Numerous other operating environments, system architectures, and device configurations are possible. Accordingly, the embodiments of the present disclosure should not be construed as being limited to any particular operating environment, system architecture, or device configuration.

Technical effects of the invention include a system and method for improving efficiency of a power plant, based in part on adjusting the operation of equipment (e.g., a condenser) in the power plant based in part on the load. A controller uses the data output by the sensor to adjust the power usage of the condenser, as the load of the power plant changes. The actual operation of the condensers within the plant or steam cycle can be modified or controlled in a number of ways, including by controlling the speed of the fan within each condenser, adjusting the pitch of the fan blades, using the condenser model to monitor the health of the tube bundles and the fan, and/or by using fewer than all of the condensers.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

The invention claimed is:

1. A steam cycle system comprising:
a heat recovery steam generator (HRSG) configured to receive exhaust gases;
a steam turbine fluidly coupled to the HRSG and configured to receive a first steam flow generated by the HRSG;
a condenser configured to condense a second steam flow output by the steam turbine, wherein the condenser comprises a plurality of heat exchanger tubes, a fan comprising one or more blades, and a steam collection header;
one or more sensors configured to measure one or more properties of the second steam flow;
a closed-loop controller communicatively coupled to the one or more sensors, wherein the controller is configured to:
receive data from the one or more sensors;
determine a flow rate of the second steam flow through the steam header using the one or more sensors;
calculate whether the flow rate of the second steam flow is within a threshold;
adjust one or more operating parameters of the fan based at least in part on the flow rate of the second steam flow; and utilize a condenser model to reduce a flow of ambient air to the fan based in part on an amount of buildup on the one or more blades to selectively operate the fan.

2. The system of claim 1, wherein the one or more sensors are configured to measure velocity, temperature, or pressure of the second steam flow.

3. The system of claim 1, wherein the one or more sensors comprises a flow rate sensor.

4. The system of claim 1, wherein adjusting the one or more operating parameters of the fan comprises adjusting a pitch angle of the one or more blades.

5. The system of claim 1, wherein adjusting the one or more operating parameters of the fan comprises reducing power consumption of the fan by adjusting the speed of the fan.

6. The system of claim 1, wherein the controller is configured to receive data from the one or more sensors and to utilize the condenser model to monitor the health of the plurality of heat exchanger tubes and the fan.

7. The system of claim 6, wherein the controller is configured to use the condenser model to reduce the flow of ambient air to the one or more blades as build up accumulates on the one or more blades.

8. The system of claim 7, wherein the controller is configured to use the condenser model to determine a degradation scenario of the one or more blades based at least in part on empirical system data.

9. The system of claim 8, wherein the empirical system data comprises an ambient air temperature and a percentage of humidity of the ambient air.

10. The system of claim 6, wherein the controller is configured to use the condenser model to determine a degradation scenario of the steam cycle system based at least in part on empirical system data.

11. The system of claim 6, wherein the controller is configured to use the condenser model to determine a degradation scenario of a gas turbine cycle based at least in part on empirical system data.

12. The system of claim 1, wherein the threshold is based in part on a load of a gas turbine.

13. The system of claim 1, wherein the threshold is based in part on a set emissions level.

14. A system comprising:
a gas turbine engine;
a steam cycle, wherein the steam cycle comprises:
  a heat recovery steam generator (HRSG) configured to receive exhaust gases;
  a steam turbine fluidly coupled to the HRSG and configured to receive a first steam flow generated by the HRSG;
  a condenser configured to condense a second steam flow output by the steam turbine, wherein the condenser comprises a plurality of heat exchanger tubes, a fan comprising one or more blades, and a steam collection header; and
one or more sensors configured to measure one or more properties of the second steam flow;
a closed-loop controller communicatively coupled to the one or more sensors, wherein the controller is configured to:
  receive data from the one or more sensors;
  determine a flow rate of the second steam flow through the steam header using the one or more sensors;
  calculate whether the flow rate of the second steam flow is within a threshold;
  adjust one or more operating parameters of the fan based at least in part on the flow rate of the second steam flow; and
  utilize a condenser model to reduce a flow of ambient air to the fan based in part on an amount of buildup on the one or more blades to selectively operate the fan.

15. The system of claim 14, wherein the one or more sensors are configured to measure velocity, temperature, or pressure of the steam flow.

16. The system of claim 14, wherein adjusting the one or more operating parameters of the fan comprises adjusting a pitch angle of the one or more blades.

17. A tangible, non-transitory computer-readable media storing computer instructions thereon, the computer instructions, when executed by a processor, configured to:
receive, via a controller, data from one or more sensors;
determine a flow rate of steam through a steam header coupled to a condenser disposed in a combined cycle power plant using the one or more sensors;
calculate whether the flow rate of the steam is within a threshold;
adjust one or more operating parameters of a fan comprising one or more blades based at least in part on the flow rate of the steam; and
reduce a flow of ambient air to the fan based in part on an amount of buildup on the one or more blades to selectively operate the fan.

18. The computer-readable media of claim 17, configured to adjust the one or more operating parameters of the fan by adjusting a pitch angle of one or more blades.

19. The computer-readable media of claim 17, configured to determine a degradation scenario based at least in part on empirical system data.

20. The computer-readable media of claim 17, configured to use a condenser model to monitor the health of a plurality of heat exchanger tubes and the fan.

* * * * *